T. A. HOOVER.
AUTOMOBILE BUMPER.
APPLICATION FILED NOV. 3, 1915.

1,212,059.

Patented Jan. 9, 1917.

WITNESSES:
B.M. Doolin
L.J. Forde

INVENTOR
Thomas A. Hoover.
BY Strong & Townsend
ATTORNEYS

UNITED STATES PATENT OFFICE.

THOMAS A. HOOVER, OF FRESNO, CALIFORNIA.

AUTOMOBILE-BUMPER.

1,212,059.

Specification of Letters Patent.

Patented Jan. 9, 1917.

Application filed November 3, 1915. Serial No. 59,367.

*To all whom it may concern:*

Be it known that I, THOMAS A. HOOVER, a citizen of the United States, residing at Fresno, in the county of Fresno and State of California, have invented new and useful Improvements in Automobile-Bumpers, of which the following is a specification.

This invention relates to bumpers or guards for the protection of the front and rear of automobiles and vehicles in general.

The object of this invention is to provide a bumper or fender that will be simple in construction, cheap in manufacture, efficient and durable in operation and made of material that will permit of its yielding with springy motion from any point of impact from which a jarring force would act upon it.

Another object in this invention is to provide a bumper graceful in outline and proportion and easy to nickel or brass plate.

A further object is to provide a bumper readily applicable to any make or size of car.

Figure 1:
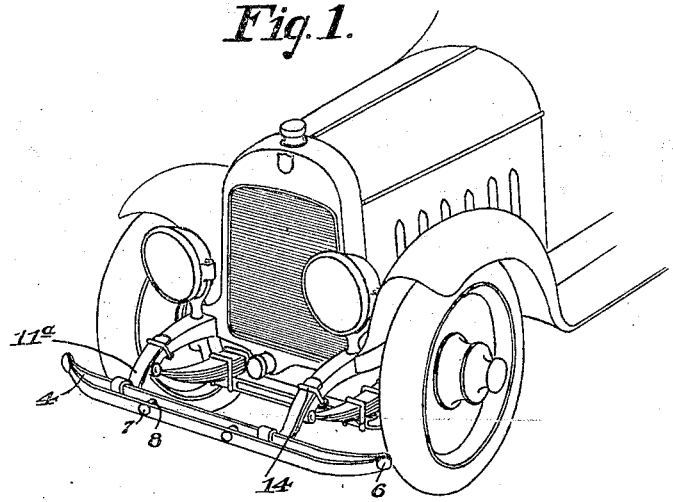
Figure 2:
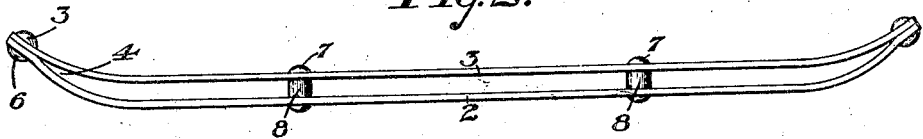
Figure 3:
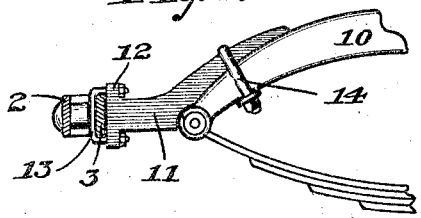
Figure 4:
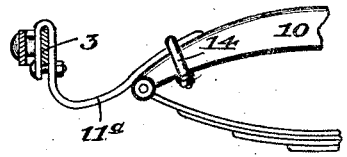

Having reference to the accompanying drawings, Figure 1 is a perspective of the front end of an automobile, showing the application of the invention. Fig. 2 is a plan view of the bumper. Fig. 3 is a side elevation, showing one form of supporting bracket. Fig. 4 is a similar view, showing another form of bracket.

The invention in actual practice comprises two bars 2—3 of spring steel 2 inches wide and one-quarter of an inch thick, and having a face frontage length of approximately 60 inches. The two bars are parallel to each other with one inch space between, to within 12 inches of each end where they come together in a crescent-shaped horn 4; the two bars meeting face to face and being riveted together by oval or half-oval headed rivets 5 and oval washers 6. The half oval heads and washers are of the width of the face of the bumper, that is, 2 inches. The ends of the riveted bar members are trussed round thus giving a very ornamental finish. The bars are also riveted in the center by two rivets 7 and tube bushings 8, through which the rivet is inserted. These rivets are about 14 inches apart and have half oval heads and washers. This bumper as shown, by reason of the situation of material forming its parts and the character or method of construction, combines all the essentials of a spring; the two parts forming the bumper proper constituting a spring in itself. This provision I regard as a great essential in the making of a practical bumper, since it dispenses with the placing of a spring adjunct at certain points, as provided for in other bumpers.

The bumper is supported from, or attached to the vehicle frame by any appropriate means. Inasmuch however, as cars of different makes and styles vary in construction, and especially as to the distance between the frame projections 10 to which the bumper is usually attached, it is highly important that means be provided for attaching the bumper to the car so as to adapt the bumper to any car. In other words, to standardize production and to enable these bumpers to be made up in quantity and carried in stock, it is essential that the attaching means for the bumper to the frame be readily adjustable. As here shown, I preferably employ a pair of adjustable brackets, as 11, Fig. 3, or 11ª Fig. 4. The brackets of Fig. 3 comprise a pair of malleable castings, the outer ends of which are flanged as at 12, to receive a U-shaped clamp bolt 13 adapted to embrace the inner bar 3 of the bumper. The other end of the bracket is provided with a curved seat to fit the frame projection 10 and to be removably secured thereto by the U clip 14. Usually the brackets 11 are attached to the frame first and then the bumper is easily adjusted to the brackets. If it is desired to give additional yield to the bumper I may employ spring steel brackets, as 11ª, Fig. 4, which are bent to substantial U-shape and secured to the bumper and the frame in the manner just described. The bumper thus constructed is made up in quantity and carried in stock; the detached brackets serving the purpose of adapting the bumper to any make or style or size of machine. This is a great advantage both to the manufacturer and user, as well as to the dealer. Heretofore it has required a different bumper for every make and size of car, thereby adding to the cost and causing delay and annoyance where a bumper suited to the particular need of a customer, could not be quickly supplied on demand.

The construction of the present bumper produces a rigid, substantial structure, which at the same time is flexible at practically any point along its face. It is furthermore, cheap to manufacture and can be quickly attached to either form of bracket shown. The rivets employed in the outer ends of the springs, together with those passing through the bushings 6, are preferably oval in shape, and are of a diameter sufficiently large to produce an ornamental effect. The bumper as a whole is therefore, artistic in design and shape and is not only an effective guard or fender, but also is an ornamental attachment to any machine. The materials and finish of the several parts of the device are otherwise such as the judgment and experience of the manufacturer may dictate.

It is to be understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. A spring bumper embodying a pair of continuous spaced spring members set on edge and connected at their ends, a pair of spacing means between the spring members arranged on opposite sides of the centers of the spring members, and brackets connected to the rear spring member and beyond the outer sides of the spacing means for supporting the bumper from a motor vehicle.

2. A bumper comprising a front spring bar and a rear spring bar disposed parallel with each other and in a horizontal plane, their terminals being rearwardly directed and secured at their extreme ends by horizontal rivets headed on the forward and rear faces of the front and rear bars respectively, and spaced means for mounting the bars on a vehicle, said means being secured to the rear bar between its ends.

3. A bumper comprising a front spring bar and a rear bar disposed in parallelism, spacers for the bars interposed between the same at spaced points, and a pair of brackets removably embracing the rear bar adjacent each spacer whereby the latter will serve as a stop to limit the rear bar from sliding in the brackets should the latter become loosened.

In testimony whereof I have hereunto set my hand in the presence of two subscribing witnesses.

THOMAS A. HOOVER.

Witnesses:
H. T. KIRCH,
E. SMEDBERG.